United States Patent
Santillan et al.

(10) Patent No.: US 10,122,874 B2
(45) Date of Patent: Nov. 6, 2018

(54) IMAGE FORMING APPARATUS, METHOD FOR CONTROLLING OPERATION SCREEN OF IMAGE FORMING APPARATUS

(71) Applicant: KYOCERA Document Solutions Inc., Osaka-shi, Osaka (JP)

(72) Inventors: Princess Jill Santillan, Osaka (JP); Jennen Bernadette Montejo, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 405 days.

(21) Appl. No.: 15/002,761

(22) Filed: Jan. 21, 2016

(65) Prior Publication Data
US 2016/0360051 A1    Dec. 8, 2016

(30) Foreign Application Priority Data

Jun. 4, 2015    (JP) ................................ 2015-113987

(51) Int. Cl.
*H04N 1/00* (2006.01)
*G06F 3/0482* (2013.01)
(Continued)

(52) U.S. Cl.
CPC ....... *H04N 1/00413* (2013.01); *G06F 3/0482* (2013.01); *G06F 3/04817* (2013.01);
(Continued)

(58) Field of Classification Search
CPC combination set(s) only.
See application file for complete search history.

(56) References Cited

U.S. PATENT DOCUMENTS 6,249,606 B1 *   6/2001   Kiraly ................ G06F 3/04883
                                                        345/156
8,782,775 B2 *   7/2014   Fadell .................. G06F 21/316
                                                        726/16
(Continued)

FOREIGN PATENT DOCUMENTS

JP    2002149011 A    5/2002
JP    2012123477 A    6/2012

OTHER PUBLICATIONS

Hashimoto, K., "Windows 8.1 Kanzen Seiha Perfect (Perfect Guide for Windows 8.1)" Shoeisha Co., Ltd., First Edition, Nov. 28, 2013, 5 pages.

*Primary Examiner* — Hien L Duong
(74) *Attorney, Agent, or Firm* — Alleman Hall Creasman & Tuttle LLP

(57) ABSTRACT

An image forming apparatus includes a touch panel unit, a standard menu screen control portion, a shortcut menu screen output portion and a shortcut processing portion. In the image forming apparatus, when a shortcut call operation is performed, a control portion causes the touch panel unit to display a shortcut menu screen over a standard menu screen. The control portion adds a shortcut icon to the shortcut menu screen and store, into a storage portion, information indicating correspondence between the added icon and the standard menu screen. When the shortcut icon is operated, the control portion causes the touch panel unit to display the standard menu screen that is associated with the operated shortcut icon.

7 Claims, 13 Drawing Sheets

(51) Int. Cl.
  *G06F 3/0488* (2013.01)
  *G06F 3/0484* (2013.01)
  *G06F 3/0481* (2013.01)
  *H04N 1/44* (2006.01)

(52) U.S. Cl.
  CPC ...... *G06F 3/04842* (2013.01); *G06F 3/04883* (2013.01); *H04N 1/00411* (2013.01); *H04N 1/4433* (2013.01); *H04N 1/442* (2013.01); *H04N 1/4413* (2013.01); *H04N 2201/0091* (2013.01); *H04N 2201/0094* (2013.01)

(56) References Cited

U.S. PATENT DOCUMENTS

| | | | | |
|---|---|---|---|---|
| 9,009,612 | B2* | 4/2015 | Fleizach | G06F 3/04883 715/729 |
| 9,230,079 | B2* | 1/2016 | Yun | G06F 21/31 |
| 9,430,084 | B2* | 8/2016 | Kim | G06F 3/0412 |
| 9,521,241 | B2* | 12/2016 | Yim | H04M 1/72563 |
| 9,823,834 | B2* | 11/2017 | Zeng | G06F 3/0488 |
| 9,826,077 | B2* | 11/2017 | Shim | H04M 1/67 |
| 9,898,189 | B2* | 2/2018 | Chen | G06F 3/0482 |
| 9,933,937 | B2* | 4/2018 | Lemay | G06F 3/04886 |
| 2007/0157089 | A1* | 7/2007 | Van Os | G06F 3/04817 715/702 |
| 2008/0036743 | A1* | 2/2008 | Westerman | G06F 3/038 345/173 |
| 2008/0089587 | A1* | 4/2008 | Kim | G06F 3/017 382/190 |
| 2008/0165153 | A1* | 7/2008 | Platzer | G06F 1/1626 345/173 |
| 2009/0178008 | A1* | 7/2009 | Herz | G06F 3/04817 715/840 |
| 2010/0162182 | A1* | 6/2010 | Oh | G06F 3/04883 715/863 |
| 2010/0306718 | A1* | 12/2010 | Shim | G06F 3/04883 715/863 |
| 2011/0034208 | A1* | 2/2011 | Gu | G06F 3/04883 455/550.1 |
| 2011/0041102 | A1* | 2/2011 | Kim | G06F 3/04883 715/863 |
| 2011/0043843 | A1* | 2/2011 | Nishiyama | H04N 1/00408 358/1.13 |
| 2011/0244924 | A1* | 10/2011 | Jung | G06F 3/0481 455/566 |
| 2011/0267634 | A1* | 11/2011 | Fukuoka | H04N 1/00408 358/1.13 |
| 2012/0166987 | A1* | 6/2012 | Kang | G06F 3/0483 715/765 |
| 2012/0304084 | A1* | 11/2012 | Kim | G06F 3/0486 715/762 |
| 2012/0320081 | A1* | 12/2012 | Kim | G06F 9/44505 345/619 |
| 2013/0019173 | A1* | 1/2013 | Kotler | G06F 3/0482 715/711 |
| 2013/0154978 | A1* | 6/2013 | Kim | G06F 3/0483 345/173 |
| 2013/0212529 | A1* | 8/2013 | Amarnath | G06F 3/017 715/810 |
| 2013/0286435 | A1* | 10/2013 | Anezaki | H04N 1/00381 358/1.15 |
| 2013/0321340 | A1* | 12/2013 | Seo | G06F 1/1641 345/174 |
| 2014/0096086 | A1* | 4/2014 | Cho | G06F 3/04847 715/847 |
| 2014/0137008 | A1* | 5/2014 | Pan | G06F 3/04883 715/761 |
| 2014/0149905 | A1* | 5/2014 | Woo | G06F 3/0485 715/768 |
| 2015/0249733 | A1* | 9/2015 | Miura | H04M 1/72563 455/566 |
| 2016/0094738 | A1* | 3/2016 | Ono | H04N 1/00501 358/1.15 |
| 2016/0210018 | A1* | 7/2016 | Singal | G06F 3/04817 |

* cited by examiner

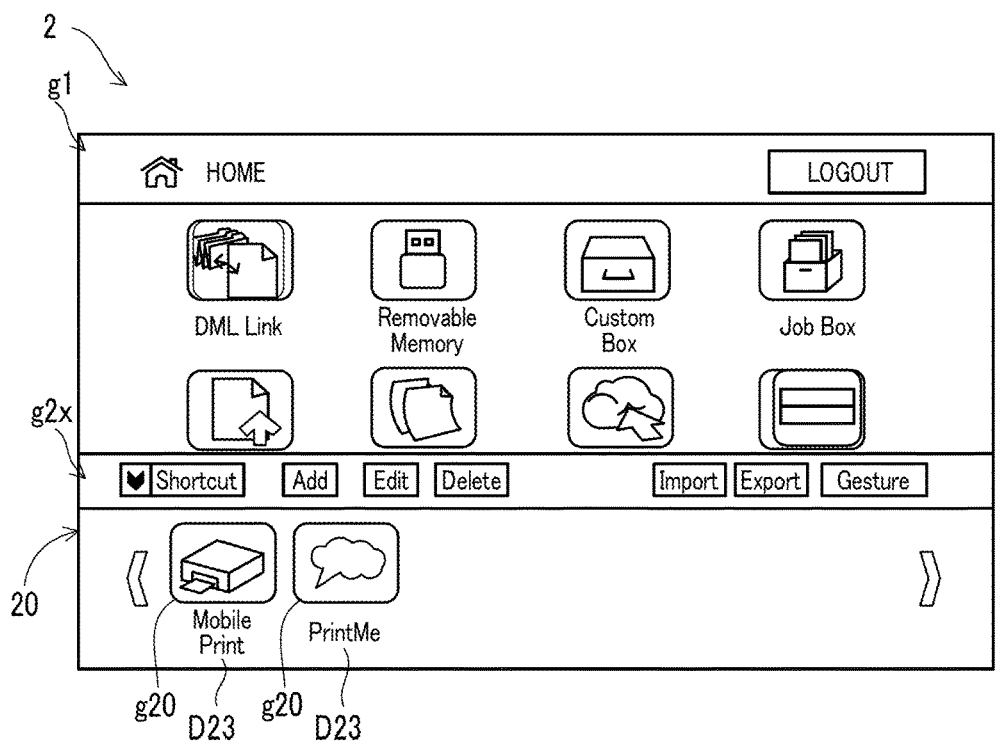

| Shortcut No. | Menu No. | Icon Data | Name | Gesture ID | Group No. | ... |
|---|---|---|---|---|---|---|
| 1 | 5 | Icon05.gif | Function Defaults | T | – | ... |
| 2 | 9 | Icon09.gif | Local User List | – | – | ... |
| 3 | 11 | Icon11.gif | Mobile Print | L | 1 | ... |
| 4 | 15 | Icon15.gif | MobileMe | ULC | 1 | ... |

D2, Group Name, D21, D11, D22, D23, D24, D25, D26

IMAGE FORMING APPARATUS, METHOD FOR CONTROLLING OPERATION SCREEN OF IMAGE FORMING APPARATUS

INCORPORATION BY REFERENCE

This application is based upon and claims the benefit of priority from the corresponding Japanese Patent Application No. 2015-113987 filed on Jun. 4, 2015, the entire contents of which are incorporated herein by reference.

BACKGROUND

The present disclosure relates to an image forming apparatus and a method for controlling an operation screen of an image forming apparatus.

In general, an image forming apparatus such as a copier or a multifunction peripheral is equipped with a touch panel unit. In the image forming apparatus, a control portion causes the touch panel unit to display a menu screen for image processing.

The control portion may, in response to a selection operation performed on the touch panel unit, cause the touch panel unit to selectively display a menu screen among a plurality of menu screens that have a hierarchical relationship. When the menu screens are hierarchically configured, it is possible to set a lot of conditions for image processing through a simple menu screen displayed on the touch panel unit that has a limited display area. As a result, even if the user is not accustomed to the operation of the image forming apparatus, the user can easily set conditions for the image processing.

On the other hand, the deeper the menu screens are hierarchically configured, the more the touch operation is required before the user can reach a target menu screen. As a result, it is preferable to register a shortcut for, for example, a frequently used menu screen based the use state of the user. This makes it possible to reach a target menu screen by performing a less number of touch operations.

There has been known that, in the image forming apparatus, the control portion causes function keys including a shortcut key to be displayed on the display area that is a part of the touch panel unit. When the shortcut key is operated, the control portion causes the touch panel unit to display a confirmation screen for confirming conditions for the image formation.

SUMMARY

An image forming apparatus according to an aspect of the present disclosure includes a touch panel unit, a standard menu screen control portion, a shortcut menu screen output portion, and a shortcut processing portion. The touch panel unit includes a panel which serves as both an operation portion and a screen display portion. The standard menu screen control portion is configured to, in response to a selection operation performed on the panel, cause the panel to display a standard menu screen among a plurality of standard menu screens for image processing. The shortcut menu screen output portion is configured to, when a shortcut call operation is performed on the panel that is displaying the standard menu screen, display a shortcut menu screen over the standard menu screen. The shortcut call operation is a predetermined gesture operation performed on the panel that is displaying the standard menu screen. The shortcut processing portion configured to execute a process in response to an operation performed on the shortcut menu screen. The shortcut processing portion includes a shortcut icon addition processing portion and a first shortcut output portion. The shortcut icon addition processing portion is configured to, when a predetermined icon addition operation is performed on the shortcut menu screen, add a shortcut icon to the shortcut menu screen and store first shortcut information into a first storage portion. The first shortcut information indicates correspondence between the added shortcut icon and the standard menu screen being displayed on the panel. The first shortcut output portion is configured to, when the shortcut icon is operated, cause the panel to display the standard menu screen that is associated with the operated shortcut icon, based on the first shortcut information.

A method for controlling an operation screen of an image forming apparatus, according to another aspect of the present disclosure, includes the following steps executed by a control portion. The control portion controls a touch panel unit having a panel which serves as both an operation portion and a screen display portion. One of the steps is causing, in response to a selection operation performed on the panel, the panel to selectively display a standard menu screen among a plurality of standard menu screens for image processing. Another one of the steps is displaying a shortcut menu screen over the standard menu screen. This step is executed when a shortcut call operation is performed on the panel that is displaying the standard menu screen. Another one of the steps is executing a process in response to an operation performed on the shortcut menu screen. This process is executed when the operation is performed on the shortcut menu screen. The shortcut call operation is a predetermined gesture operation performed on the panel that is displaying the standard menu screen. The process executed in response to the operation performed on the shortcut menu screen includes the following two steps. One of the two steps is adding a shortcut icon to the shortcut menu screen and storing shortcut information into a storage portion. This step is executed when a predetermined icon addition operation is performed on the shortcut menu screen. The shortcut information indicates correspondence between the added shortcut icon and the standard menu screen being displayed on the panel. The other of the two steps is causing the panel to display the standard menu screen that is associated with the operated shortcut icon, based on the shortcut information. This step is executed when the shortcut icon is operated.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 18 is a diagram showing a shortcut menu screen that was displayed by operating the shortcut group icon in the image forming apparatus.

FIG. 19 is a diagram showing an example of a data configuration of standard menu information that is stored in advance in the image forming apparatus.

DETAILED DESCRIPTION

The following describes an embodiment of the present disclosure with reference to the attached drawings. It should be noted that the following embodiments are examples of specific embodiments of the present disclosure and should not limit the technical scope of the present disclosure.

[Configuration of Image Forming Apparatus 10]

First, a description is given of the configuration of an image forming apparatus 10 according to the present embodiment. The image forming apparatus 10 forms an image on a sheet material.

Figure 1:
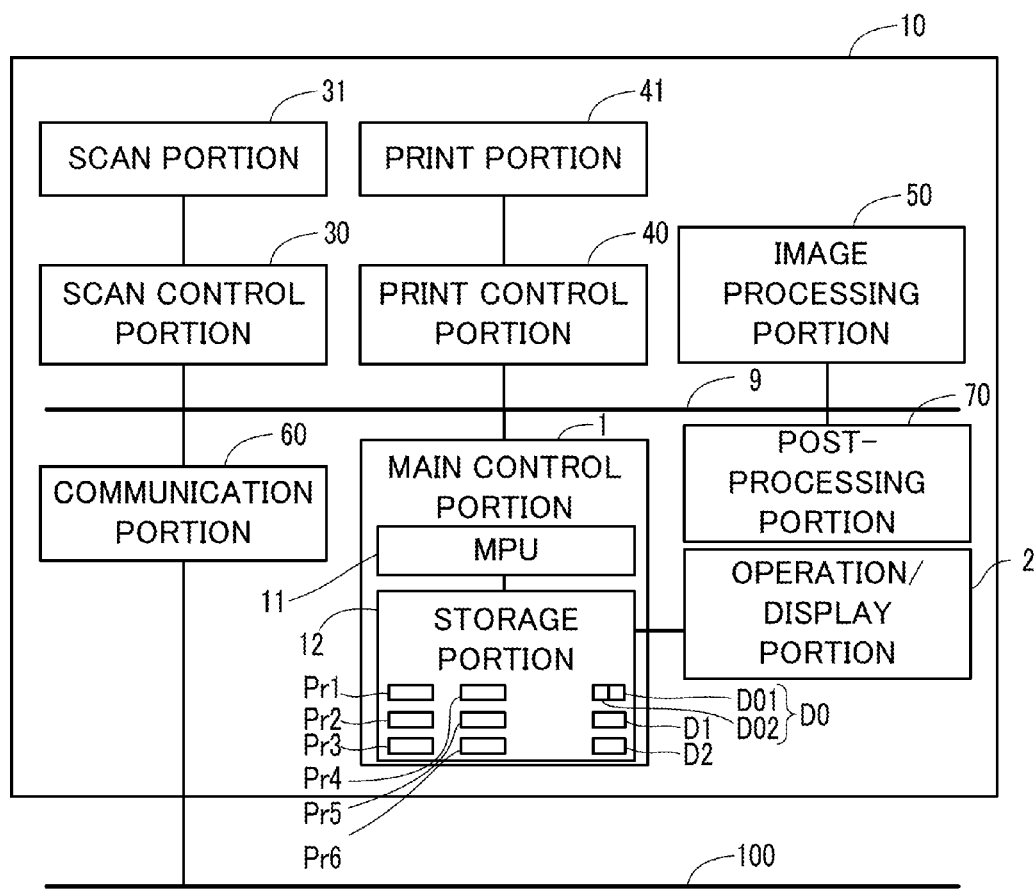
FIG. 1 is a block diagram showing an image forming apparatus according to an embodiment of the present disclosure.

The image forming apparatus 10 shown in FIG. 1 is a multifunction peripheral having a plurality of functions including: a function of an image reading device to read an image from a document sheet; and a function of an image forming device to form an image on a sheet material. It is noted that the image forming apparatus 10 may be a facsimile apparatus that includes an image transmitting function.

The image forming apparatus 10 includes a main control portion 1, an operation/display portion 2, a scan portion 31, a scan control portion 30, a print portion 41, a print control portion 40, a communication portion 60, an image processing portion 50, and a post-processing portion 70.

The main control portion 1, scan control portion 30, print control portion 40, communication portion 60, and image processing portion 50 are respectively connected to a bus 9, and can transmit and receive data mutually via the bus 9.

The scan portion 31 includes an optical system (not shown) for scanning the document sheet with light, and an image sensor (not shown) for detecting an amount of light reflected from the document sheet for each pixel, and outputting document sheet image data.

The scan control portion 30 obtains the document sheet image data by controlling the scan portion 31. Furthermore, the scan control portion 30 transmits the document sheet image data via the bus 9 to other devices such as the image processing portion 50.

The print portion 41 forms an image onto the sheet material by performing a well-known electrophotographic image formation process. The print portion 41, including an image carrying member and its peripheral devices, transfers an image of developer from the image carrying member to the sheet material, and fixes the image to the sheet material.

The print control portion 40 causes the print portion 41 to execute a process of obtaining image data for recording from the image processing portion 50, and forming an image onto a recording sheet based on the image data for recording.

The communication portion 60 transmits and receives data to/from an external apparatus via a network 100. The external apparatus is, for example, another image forming apparatus 10 or a personal computer (not shown).

Furthermore, the communication portion 60 transmits and receives data to/from other devices via the bus 9. For example, the communication portion 60 receives job data for image formation from the external apparatus and transmits the job data to the image processing portion 50 via the bus 9.

In addition, the communication portion 60 has a function to obtain the document sheet image data from the scan control portion 30 via the image processing portion 50, and transmit data including the document sheet image data to the external apparatus.

The image processing portion 50 executes various types of data processes onto, for example, image data obtained from another device via the bus 9. The targets of the data processes executed by the image processing portion 50 are, for example, the document sheet image data obtained from the scan control portion 30, and the job data obtained from the external apparatus via the communication portion 60.

The image processing portion 50 performs, for example, image processing such as the image rotation process, halftone process, and size-cut process onto the document sheet image data obtained from the scan control portion 30. In addition, the image processing portion 50 performs a process in which it converts the document sheet image data obtained from the scan control portion 30 and the job data obtained from the communication portion 60, to the recording image data, and transmits the recording image data to the print control portion 40.

The post-processing portion 70 executes post-processing, such as a staple process, a punch-hole forming process, and a shift discharge process, onto the sheet material after the image formation.

Figure 2:
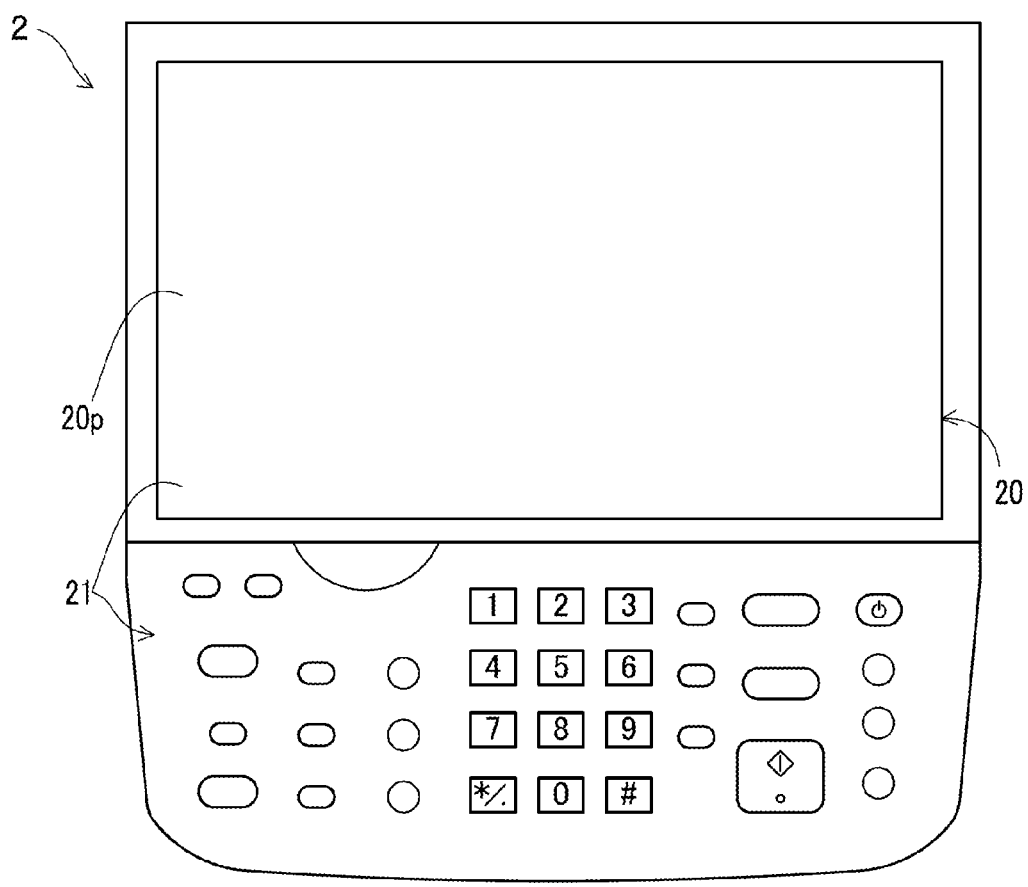
FIG. 2 is an outer appearance view of an operation display portion included in the image forming apparatus.

As shown in FIG. 2, the operation/display portion 2 includes a touch panel unit 20 that includes a panel 20p which serves as both a screen display portion and an operation portion. In the example shown in FIG. 2, the operation/display portion 2 includes operation buttons as well. The touch panel unit 20 includes a panel display portion and a touch panel sensor, wherein the panel display portion is, for example, a liquid crystal display panel, and the touch panel sensor is formed on a surface of the panel display portion.

Hereinafter, the touch panel sensor and the operation buttons through which operations performed on the touch panel unit 20 are detected, are collectively referred to as an operation portion 21. An operation to the touch panel unit 20 is an operation to the panel 20p of the touch panel unit 20. Similarly, displaying a screen on the touch panel unit 20 means displaying a screen on the panel 20p of the touch panel unit 20.

The main control portion 1 comprehensively controls other control portions. For example, the main control portion 1 causes the touch panel unit 20 to display a menu screen for image processing. Furthermore, the main control portion 1 outputs control commands to other control portions based on input information that is input via an operation to the operation portion 21, or based on detection results of various types of sensors.

As shown in FIG. 2, the main control portion 1 includes a MPU (Micro Processor Unit) 11 and a storage portion 12.

The MPU 11 is a processor for executing various types of calculations and data processing. The storage portion 12 is a non-volatile storage portion for storing various types of information that are referred to by the MPU 11. In addition, the storage portion 12 is a storage portion to/from which various types of information can be written or read.

The storage portion 12 stores programs that cause the MPU 11 to execute various types of processing, and stores information which is referred to or written by the MPU 11 that is executing a program.

For example, the storage portion 12 stores authentication information D0, standard menu information D1, and shortcut information D2. The authentication information D0 is information that uniquely identifies one or more users who may use the image forming apparatus 10, and is used in an authentication process which is performed to determine whether or not to permit a use of the image forming apparatus 10. It is noted that the authentication information D0, standard menu information D1, and shortcut information D2 may be stored separately in a plurality of storage portions 12.

For example, the authentication information D0 includes user identification information D01 and secret identification information D02, wherein the user identification information D01 may be disclosed, and the secret identification information D02, such as a password, is not disclosed. The standard menu information D1 and the shortcut information D2 are described below.

Figure 7:
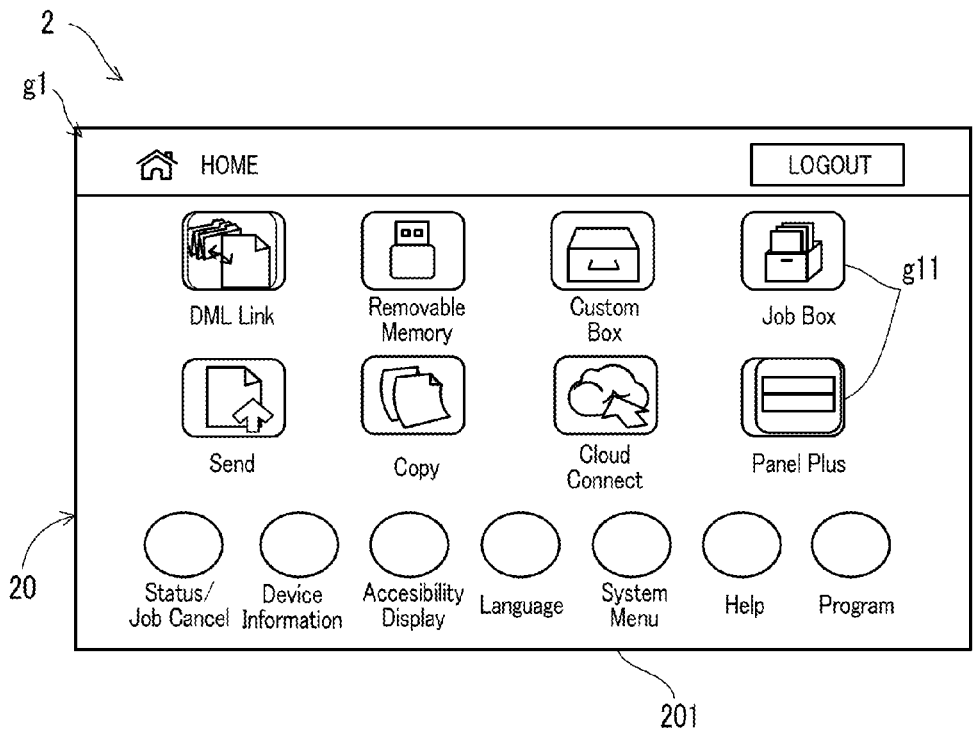
FIG. 7 is a diagram showing a first example of a menu screen of the image forming apparatus.

Hereinafter, a menu screen prepared for image processing in advance is referred to as a standard menu screen g1 (see FIG. 7). The standard menu screen g1 is used for setting conditions for the image processing such as the image reading process and the image formation process.

The main control portion 1, in response to a selection operation performed on the touch panel unit, causes the touch panel unit 20 to selectively display a standard menu screen g1 among a plurality of standard menu screens g1 that have a hierarchical relationship. When the standard menu screens g1 are hierarchically configured, it is possible to set a lot of conditions for image processing through a simple standard menu screen g1 displayed on the touch panel unit 20 that has a limited display area. As a result, even if the user is not accustomed to the operation of the image forming apparatus 10, the user can easily set conditions for the image processing.

On the other hand, the deeper the standard menu screens g1 are hierarchically configured, the more the touch operation is required before the user can reach a target standard menu screen g1. As a result, it is preferable to register a shortcut for, for example, a frequently used standard menu screen g1 based the use state of the user. This makes it possible to reach a target standard menu screen g1 by performing a less number of touch operations.

Meanwhile, if an operation icon that realizes the shortcut function is always displayed like so-called function keys, the display size and the amount of information that can be included in the standard menu screen g1 for image processing are restricted accordingly.

On the other hand, the shortcut function does not necessarily be required at all times. As a result, it is preferable that a shortcut can be registered and used while using the display area of the touch panel unit 20 as much as possible as an area of the standard menu screen g1.

The image forming apparatus 10 executes an operation screen control and a short cut process that are described below. With this configuration of the image forming apparatus 10, it is possible to register and use a shortcut while securing the area of the standard menu screen g1 for image processing as much as possible in the display area of the touch panel unit 20.

[Operation Screen Control]

Next, an example of a procedure of the operation screen control executed by the main control portion 1 of the image forming apparatus 10 is described with reference to the flowchart shown in FIG. 3. In the following description, S101, S102, . . . are identification signs representing the steps executed by the main control portion 1. The following processes of the main control portion 1 are realized as the MPU 11 executes control programs.

<Step S101>

After the image forming apparatus 10 is powered on, first, the main control portion 1 executes an authentication process. In the authentication process, it is determined whether or not an authentication is successful or not by comparing authentication input information with authentication information D0 that is stored in the storage portion 12 in advance. The authentication input information is input via the operation portion 21 of the operation/display portion 2 or via another information input portion.

As one example, the main control portion 1 causes the touch panel unit 20 to display a login screen (not shown), and obtains authentication input information via the operation portion 21 that is operated by the user. Furthermore, the main control portion 1 compares the authentication input information with the authentication information D0 stored in advance in the storage portion 12.

When the authentication input information and the authentication information D0 match, the authentication is successful. Otherwise, the authentication is unsuccessful.

It is noted that the authentication input information may be input by a method other than the method of inputting characters, signs or the like through operations performed on the operation portion 21.

For example, the main control portion 1 may input, as the authentication input information, the user's biological information via a biological information input device. In this case, the image forming apparatus 10 includes, as the biological information input device, a fingerprint reading sensor for reading a fingerprint, or a camera for photographing a face image.

In the following description, the authentication information D0 that was used in the authentication process of step S101 when the authentication was determined successful, and a user associated with the authentication information D0 are called successful authentication information and authentication successful user, respectively.

<Step S102>

When the authentication process is determined unsuccessful, the main control portion 1 causes the touch panel unit 20 to display an error message, and returns to step S101.

It is noted that the processes of steps S101 and S102 are realized as the MPU 11 of the main control portion 1 executes an authentication program Pr1. In the processes of steps S101 and S102, the authentication process is executed, and when the authentication process is successful, the standard menu screen g1 is permitted to be operated. The main control portion 1 that executes the processes of steps S101 and S102 is an example of the authentication control portion.

<Step S103>

When the authentication process is successful, the main control portion 1 causes the touch panel unit 20 to display a standard menu screen g1. The standard menu screen g1 that is displayed first is a so-called main menu screen.

The standard menu screen g1 includes various types of operation icons g11. The operation icons g11 include icons that represent jobs to be selected and icons used to set operation conditions for the jobs, wherein the jobs represented by the icons are, for example, copying, transmission of scan image data, storing of scan image data, and Internet connection.

<Step S104>

Next, the main control portion 1 determines what operation was performed on the operation portion 21 while the standard menu screen g1 was displayed.

<Step S105>

Upon detecting that an operation icon g11 included in the standard menu screen g1 was operated, the main control portion 1 sets a mode for the job that is to be executed. The mode for the job is, for example, a type of the job that is associated with the type of the operated operation icon g11, or an operation condition for the job.

<Step S106>

Furthermore, the main control portion 1 causes the touch panel unit 20 to display the next standard menu screen g1 that is associated with the type of the operated operation icon g11. The main control portion 1 then returns to step S104 to repeat the processes from step S104 on the newly displayed standard menu screen g1.

In steps S103-S106, the main control portion 1 causes the touch panel unit 20 to selectively display one of a plurality of standard menu screen g1 for image processing, based on the selection operation performed on the touch panel unit 20.

The processes of steps S103-S106 are realized as the MPU 11 of the main control portion 1 executes a standard menu screen control program Pr2. The main control portion 1 that executes the processes of steps S103-S106 is an example of the standard menu screen control portion.

<Step S107>

Upon detecting that a predetermined shortcut call operation was performed on the touch panel unit 20 that was displaying the standard menu screen g1, the main control portion 1 causes the touch panel unit 20 to display a shortcut menu screen g2.

The shortcut call operation is a predetermined gesture operation that is performed on the touch panel unit 20 that is displaying the standard menu screen g1. The gesture operation is a touch operation performed on the touch panel unit 20, the touch operation changing in time series.

Figure 8:
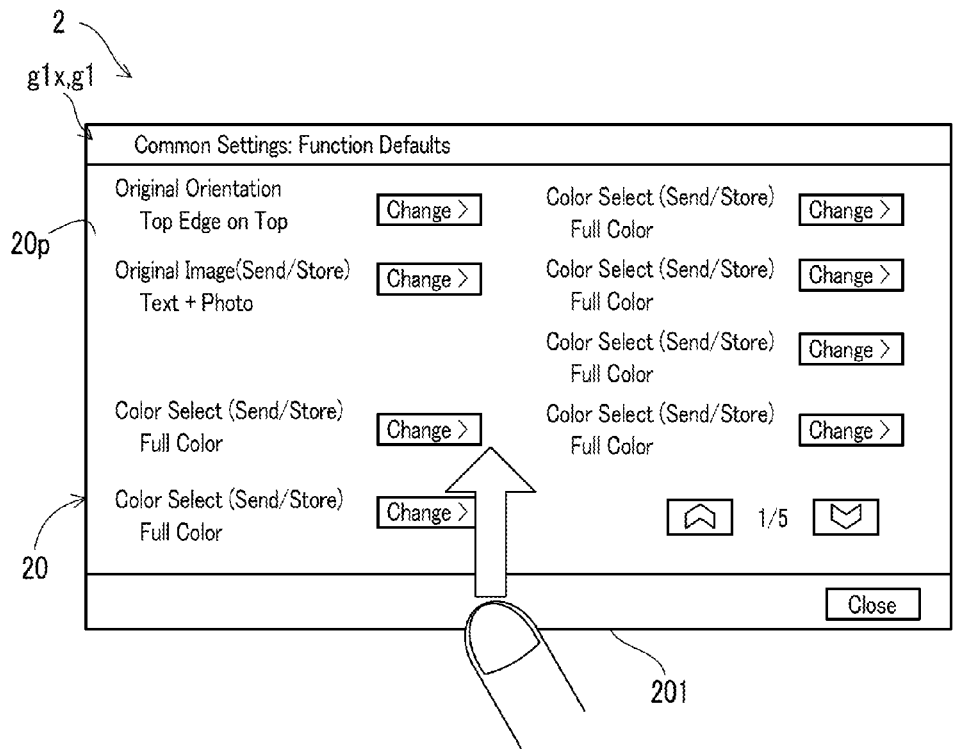
FIG. 8 is a diagram showing a touch panel unit when a shortcut call operation is performed on an objective menu screen of the image forming apparatus.

The shortcut call operation shown in FIG. 8 is a swipe operation of moving the touch position toward the inside of the panel 20p, the origin of the movement being a lower side of the panel 20p of the touch panel unit 20.

Figure 9:
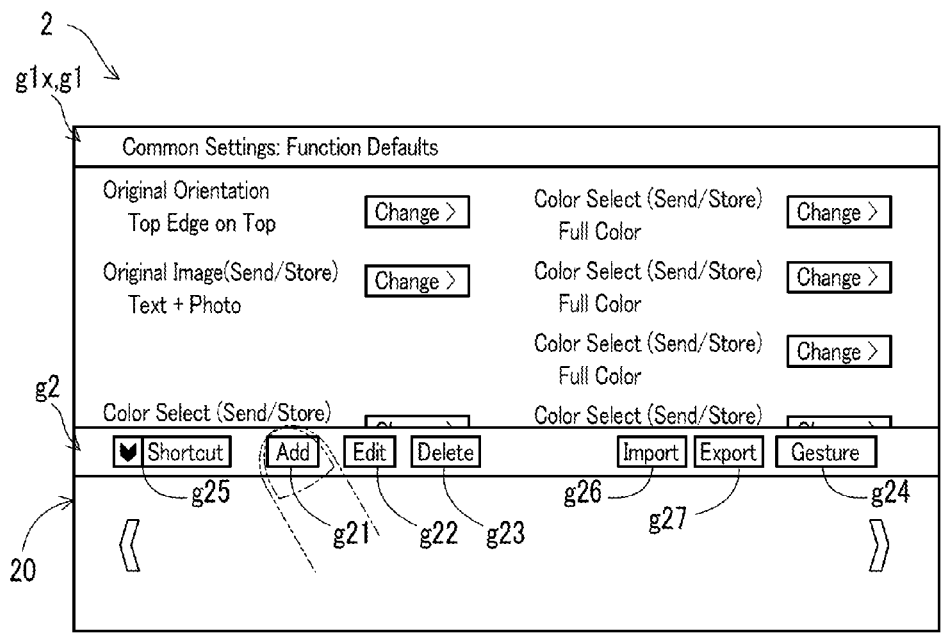
FIG. 9 is a diagram showing a shortcut menu screen in an initial state displayed on the image forming apparatus.

As shown in FIG. 9, the main control portion 1 displays the shortcut menu screen g2 over the standard menu screen g1, on the touch panel unit 20. In the example shown in FIG. 9, the shortcut menu screen g2 is displayed over a part of the standard menu screen g1.

FIG. 9 shows the shortcut menu screen g2 in the initial state. The shortcut menu screen g2 in the initial state does not include a shortcut icon g20 yet. The shortcut icon g20 is an operation icon that is touched in order to move to a target standard menu screen g1.

The shortcut menu screen g2 includes Add icon g21, Edit icon g22, and Delete icon g23. In the example shown in FIG. 9, the shortcut menu screen g2 further includes Gesture registration icon g24, Mode selection icon g25, Import icon g26, and Export icon g27.

The process of step S107 is realized as the MPU 11 of the main control portion 1 executes a shortcut menu screen output program Pr3. The main control portion 1 that executes the process of step S107 is an example of the shortcut menu screen output portion.

<Step S108>

When the shortcut menu screen g2 is displayed on the touch panel unit 20, the main control portion 1 executes a shortcut process. In the shortcut process, a shortcut icon g20 is added to the shortcut menu screen g2, or the settings for a shortcut icon g20 are edited. The shortcut process is described below in detail.

<Step S109>

Upon detecting that a registration shortcut operation that had been registered in advance was performed on the touch panel unit 20 that was displaying the standard menu screen g1, the main control portion 1 causes the touch panel unit 20 to display a standard menu screen g1 that has been associated with the registration shortcut operation in advance.

The process of registering the registration shortcut operation and associating the registration shortcut operation with the standard menu screen g1 is included in the shortcut process. The process is described below in detail.

After the shortcut process of step S108 ends, or the process of step S109 ends, the main control portion 1 returns to step S104 to repeat the processes from step S104.

[Shortcut Process]

Figure 3:
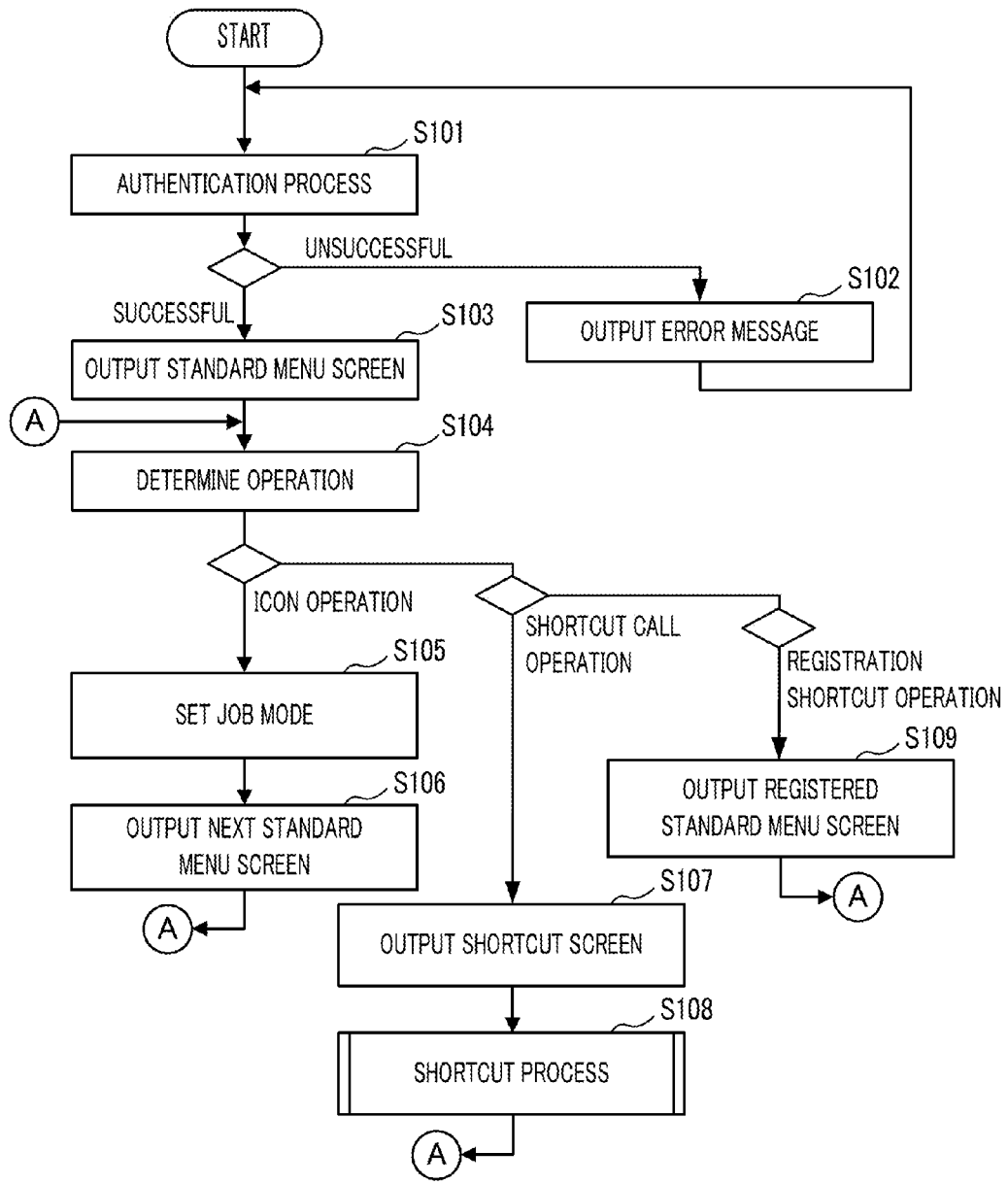
FIG. 3 is a flowchart showing an example of a procedure of an operation screen control performed in the image forming apparatus.
Figure 4:
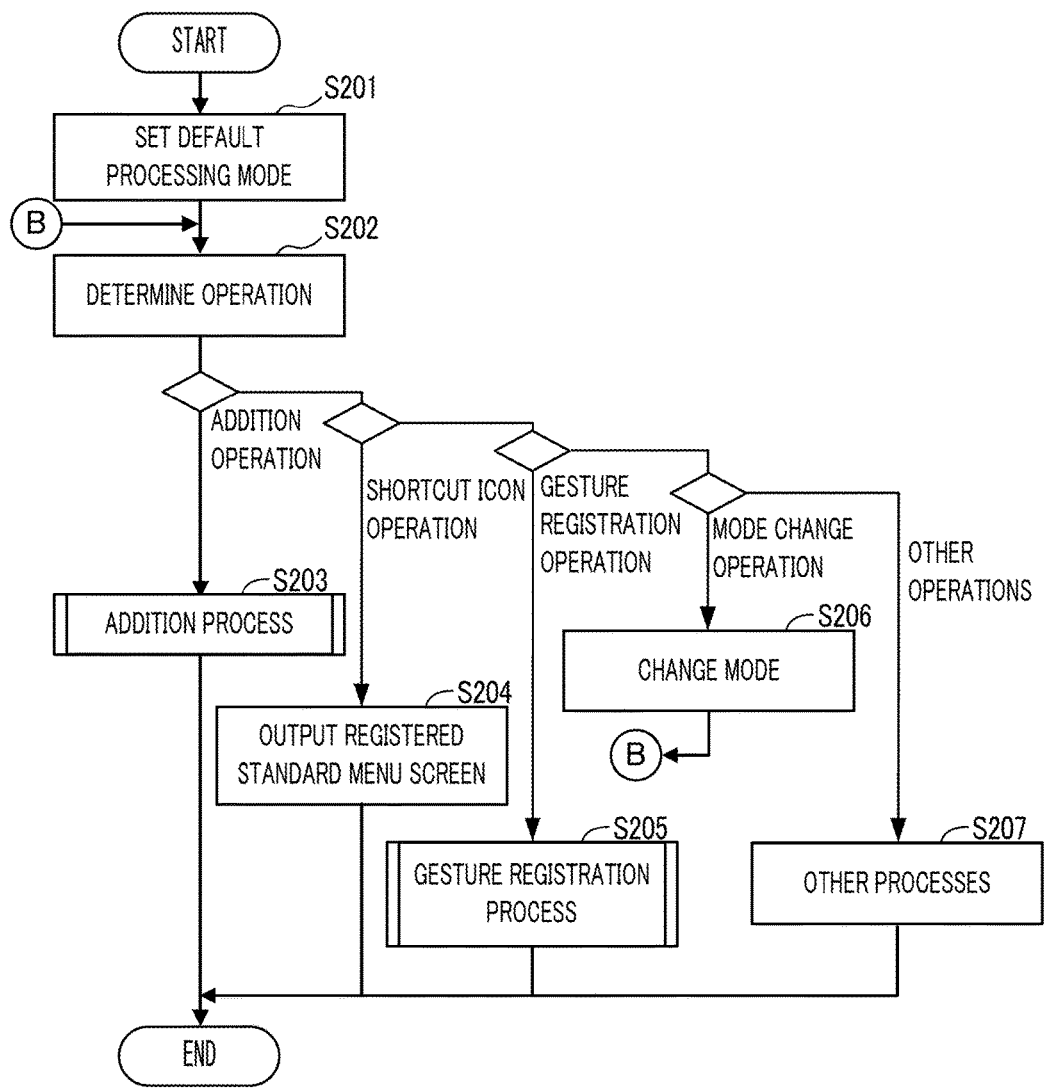
FIG. 4 is a flowchart showing an example of a procedure of a shortcut process performed in the operation screen control of the image forming apparatus.

Next, a description is given of an example of a procedure of the shortcut process (step S108 of FIG. 3) executed by the main control portion 1 of the image forming apparatus 10, with reference to the flowchart shown in FIG. 4. In the following description, S201, S202, . . . are identification signs representing the steps executed by the main control portion 1.

In the shortcut process, the main control portion 1 executes a process in response to an operation performed on the shortcut menu screen g2. The following process of the main control portion 1 is realized as the MPU 11 executes a shortcut process program Pr4. The main control portion 1 that executes the shortcut process program Pr4 is an example of the shortcut processing portion.

<Step S201>

In the shortcut process, first, the main control portion 1 sets a default processing mode. The processing mode is a flag that specifies one of a plurality of cases of the shortcut process. The processing mode is either a shortcut mode or a group mode. In this example, the default processing mode is the shortcut mode.

The shortcut mode is a flag that specifies execution of adding, editing or the like of a shortcut icon g20. The group mode is a flag that specifies execution of grouping of shortcut icons g20 or editing of a group.

Figure 16:
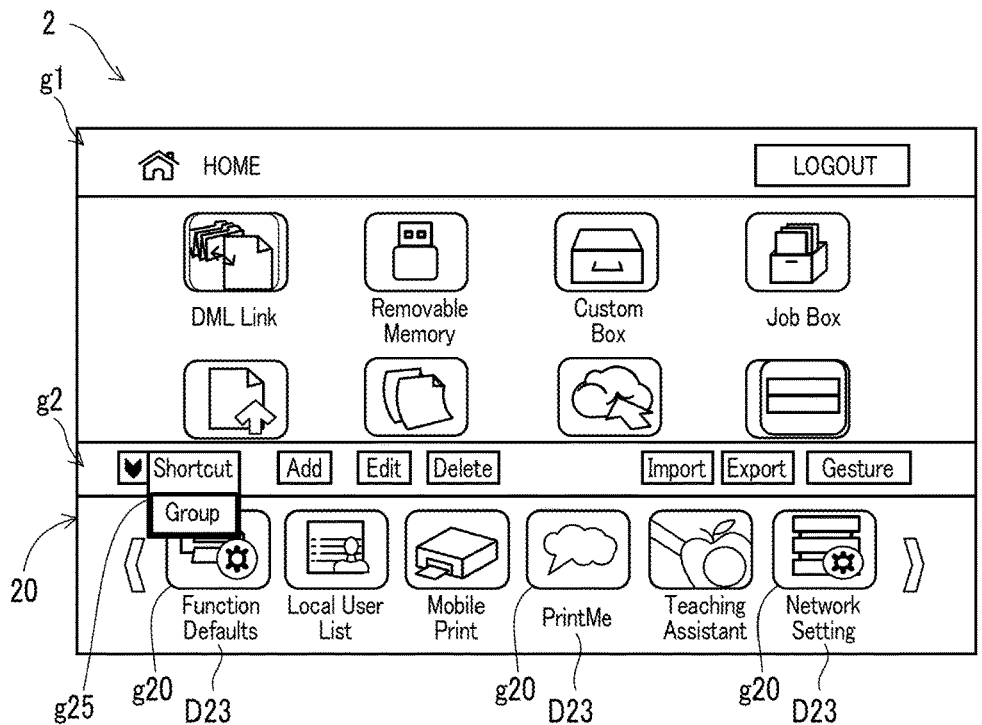
FIG. 16 is a diagram showing the touch panel unit when a group mode is selected on a shortcut menu screen in the image forming apparatus.

The processing mode can be changed by operating a mode selection icon g25 of the shortcut menu screen g2. FIG. 16 shows how the processing mode is changed from the shortcut mode to the group mode by operating the mode selection icon g25.

<Step S202>

Next, the main control portion 1 determines what operation was performed while the shortcut menu screen g2 was displayed.

<Step S203>

Upon detecting that Add icon g21 included in the shortcut menu screen g2 was operated, the main control portion 1 executes an addition process that is described below. When the addition process ends, the shortcut process ends.

<Step S204>

Upon detecting that a shortcut icon g20 included in the shortcut menu screen g2 was operated, the main control portion 1 causes the touch panel unit 20 to display a standard menu screen g1 that has been associated with the shortcut icon g20 in advance.

The process of adding a shortcut icon g20 to the shortcut menu screen g2 and associating the shortcut icon g20 with the standard menu screen g1 is included in the addition process. The addition process is described below in detail. When the process of step S204 ends, the shortcut process ends.

<Step S205>

Upon detecting that the Gesture registration icon g24 included in the shortcut menu screen g2 was operated, the main control portion 1 executes a gesture registration process that is described below. When the gesture registration process ends, the shortcut process ends.

<Step S206>

Upon detecting that a mode change operation was performed by operating the Mode selection icon g25 included in the shortcut menu screen g2, the main control portion 1 changes the processing mode (see FIG. 16). After the processing mode is changed, the main control portion 1 returns to step S202 to repeat the processes from step S202. It is noted that the processing mode is referred to in the addition process.

<Step S207>

Upon detecting that any of the other operation icons included in the shortcut menu screen g2 was performed, the main control portion 1 executes a process that is associated with the operated icon. When the process ends, the shortcut process ends.

In the present embodiment, the other operation icons are the Edit icon g22, Delete icon g23, Import icon g26, and Export icon g27. Processes associated with these operation icons are described below in detail.

[Addition Process]

Figure 5:
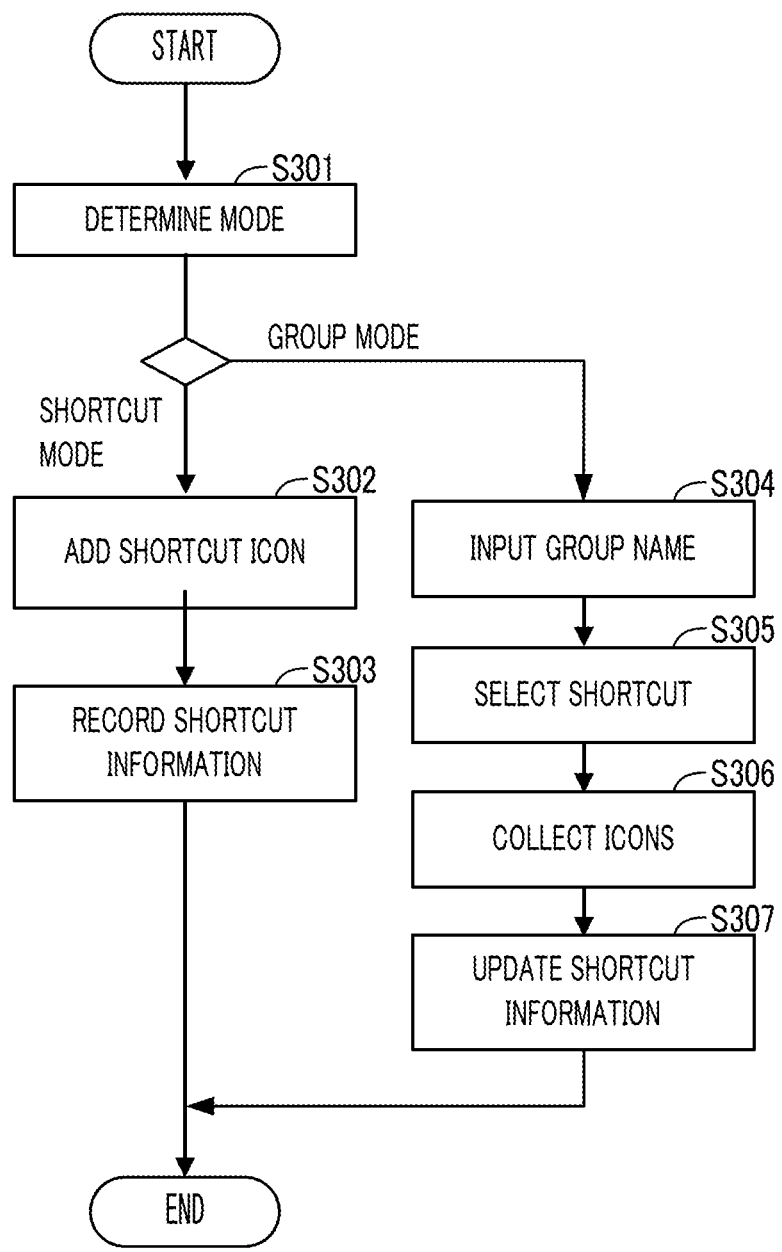
FIG. 5 is a flowchart showing an example of an addition process performed in the shortcut process of the image forming apparatus.

Next, a description is given of an example of a procedure of the addition process (step S203 of FIG. 4) executed by the main control portion 1 of the image forming apparatus 10, with reference to the flowchart shown in FIG. 5. In the following description, S301, S302, . . . are identification signs representing the steps executed by the main control portion 1.

The following processing of the main control portion 1 is realized as the MPU 11 executes an addition process program Pr5.

<Step S301>

In the addition process, first, the main control portion 1 determines which of the shortcut mode or the group mode the processing mode is.

The user performs the shortcut call operation and operates the Add icon g21 in a state where a standard menu screen g1 with which the user desires to associate an addition-target shortcut icon g20 is displayed on the touch panel unit 20.

In the following description, the standard menu screen g1 that is displayed on the touch panel unit 20 while the shortcut call operation is performed, is referred to as an objective menu screen g1x (see FIGS. 8-10). That is, the standard menu screen g1 displayed under the shortcut menu screen g2 is the objective menu screen g1x.

<Step S302>

When the Add icon g21 is operated when the processing mode is the shortcut mode, the main control portion 1 adds a shortcut icon g20 to the shortcut menu screen g2.

Figure 10:
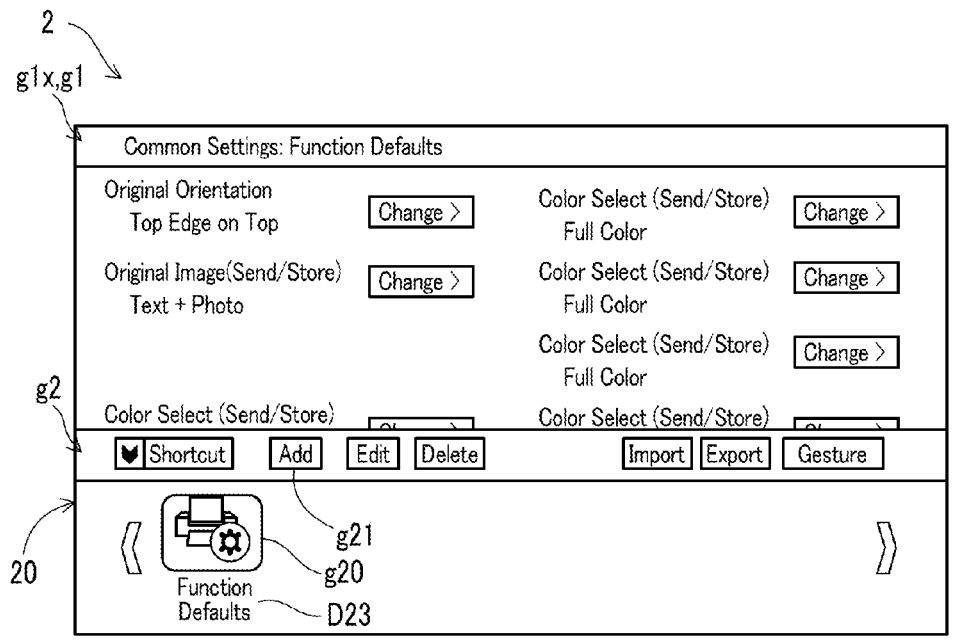
FIG. 10 is a diagram showing a shortcut menu screen to which a shortcut icon has been added in the image forming apparatus.

FIG. 10 shows the shortcut menu screen g2 to which one shortcut icon g20 has been added. The main control portion 1 may add, together with the shortcut icon g20, an icon name D23 to the shortcut menu screen g2.

In step S302, the main control portion 1 adds a shortcut icon g20 that is associated with the objective menu screen g1x, to the shortcut menu screen g2. The main control portion 1 identifies the type of the shortcut icon g20 associated with the objective menu screen g1x, based on the standard menu information D1 that has been stored in the storage portion 12 in advance.

FIG. 19 shows an example of a data configuration of the standard menu information D1. In the example shown in FIG. 19, the standard menu information D1 includes a plurality of columns associated with each other, such as menu number D11, default icon data D12, and default name D13.

The menu number D11 includes identification information of the standard menu screens g1. The default icon data D12 includes file names of default shortcut icons g20 that are respectively associated with the standard menu screens g1 indicated in the menu number D11.

Data files of the shortcut icons g20 indicated in the default icon data D12 are stored in the storage portion 12 in advance. In step S302, the main control portion 1 identifies, by referring to the standard menu information D1, a shortcut icon g20 in the default icon data D12 that is associated with a standard menu screen g1 of the objective menu screen g1x indicated in the menu number D11. Furthermore, the main control portion 1 adds the shortcut icon g20 that was indicated in the default icon data D12, to the shortcut menu screen g2.

The default name D13 indicates default icon names of the shortcut icons g20 indicated in the default icon data D12. In step S302, the main control portion 1 identifies, by referring to the standard menu information D1, an icon name indicated in the default name D13 that is associated with the standard menu screen g1 of the objective menu screen g1x indicated in the menu number D11. Furthermore, the main control portion 1 adds the identified icon name of the default name D13 to the shortcut menu screen g2, as the icon name D23.

<Step S303>

Furthermore, the main control portion 1 stores shortcut information D2 of the added shortcut icon g20 into the storage portion 12. The shortcut information D2 indicates correspondence between the added shortcut icon g20 and the objective menu screen g1x.

Figures 20, 21:
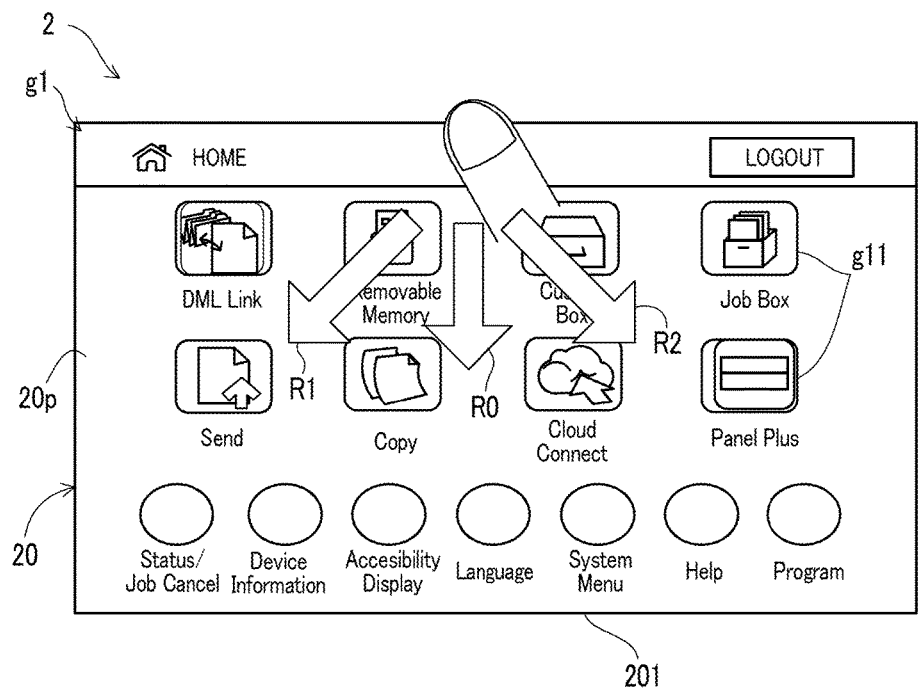
FIG. 20 is a diagram showing an example of a data configuration of shortcut information recorded in the image forming apparatus.
FIG. 21 is a diagram showing the touch panel when a registration gesture operation according to an application example is performed on an arbitrary menu screen in the image forming apparatus.

FIG. 20 shows an example of the data configuration of the shortcut information D2. In the example shown in FIG. 20, the shortcut information D2 includes shortcut number D21, menu number D11, icon data D22, and icon name D23.

The shortcut number D21 indicates identification numbers of the shortcut icons g20 that are included in the shortcut menu screen g2. The menu number D11 indicates identification numbers of standard menu screens g1 that are associated with the shortcut icons g20.

The icon data D22 indicates file names of the shortcut icons g20 that are included in the shortcut menu screen g2.

In step S303, the main control portion 1 stores, as the shortcut information D2, the shortcut number D21, menu number D11, icon data D22, and icon name D23 that are associated with the added shortcut icons g20, into the storage portion 12.

In addition, the shortcut information D2 includes gesture identifier D24 and group number D25 associated with the shortcut number D21. Furthermore, the shortcut information D2 may include group name D26 that is associated with the group number D25. In step S303, the gesture identifier D24 and the group number D25 have not been set yet. The gesture identifier D24 and the group number D25 are described below.

It is noted that the shortcut number D21, the menu number D11, and the icon data D22 of the shortcut information D2 that are recorded in the storage portion 12 in step S303 are an example of the first shortcut information.

Figure 11:
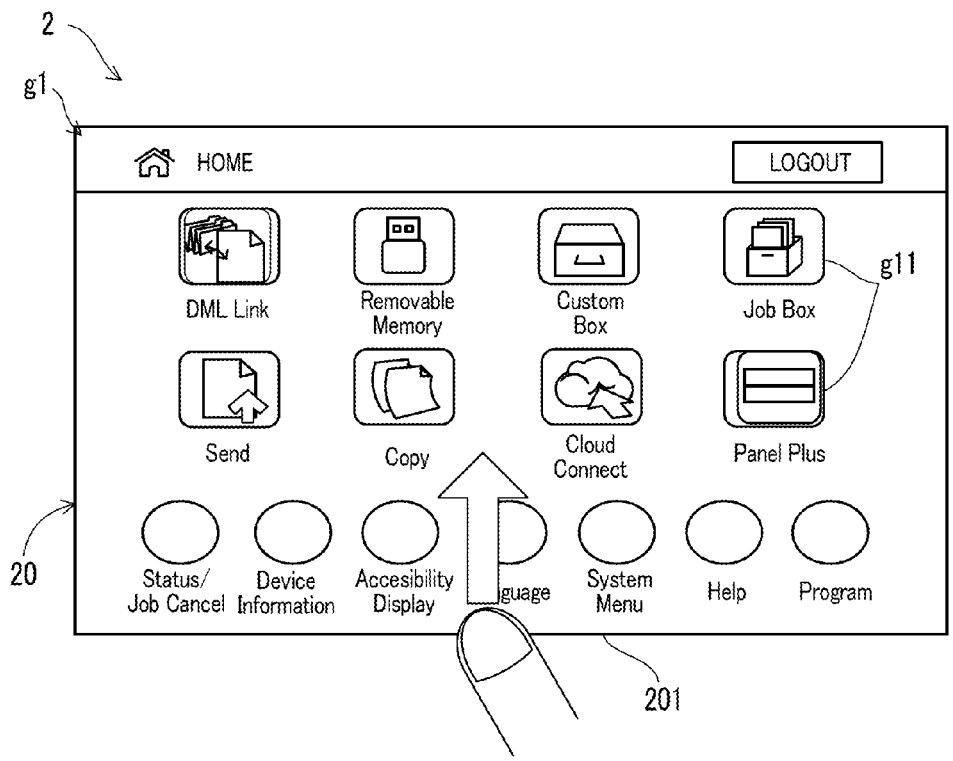
FIG. 11 is a diagram showing a touch panel unit when the shortcut call operation is performed on an arbitrary menu screen of the image forming apparatus.
Figure 12:
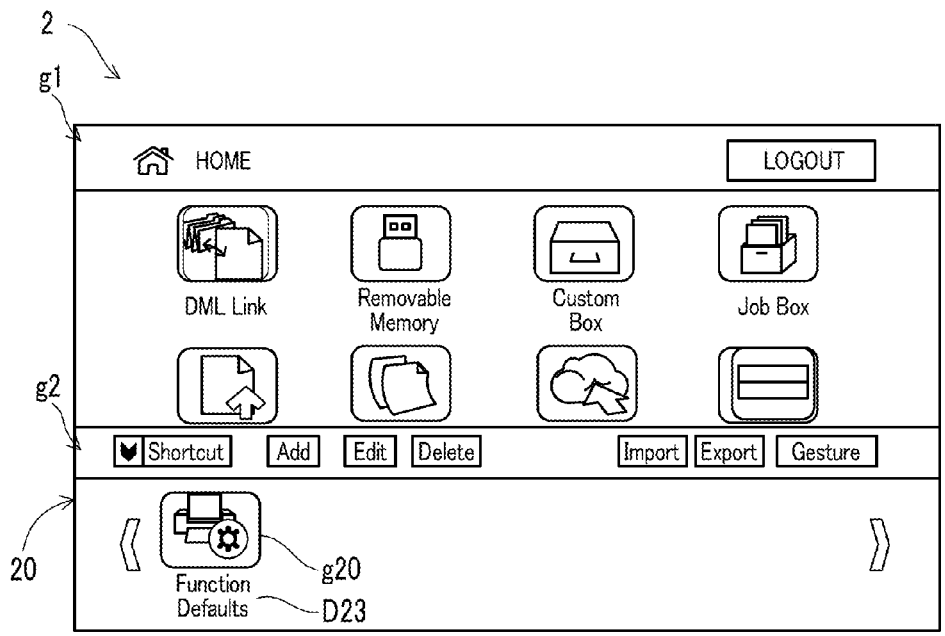
FIG. 12 is a diagram showing a shortcut menu screen displayed on an arbitrary menu screen of the image forming apparatus.

When the processes of steps S302 and S303 end, the addition process ends. After the shortcut information D2 is registered in the storage portion 12, the main control portion 1, in step S107 of FIG. 3, can cause the touch panel unit 20 to display a shortcut menu screen g2 including the shortcut icons g20 (see FIGS. 11 and 12).

Figure 13:
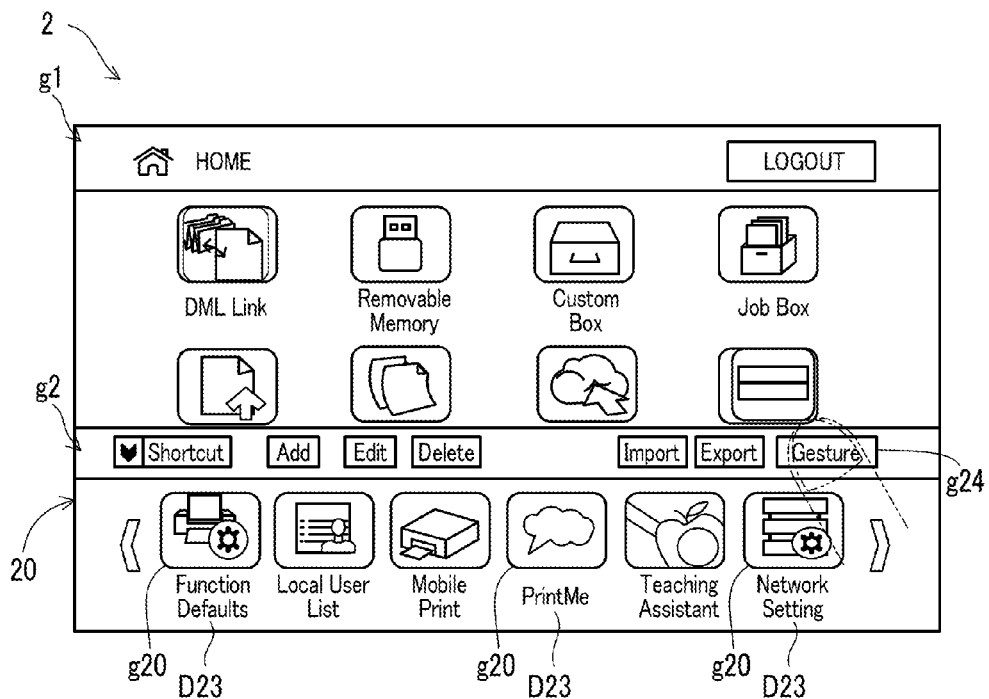
FIG. 13 is a diagram showing a shortcut menu screen to which a plurality of shortcut icons have been added in the image forming apparatus.

FIG. 13 shows a shortcut menu screen g2 to which a plurality of shortcut icons g20 have been added. Such a shortcut menu screen g2 is displayed after the addition process is executed a plurality of times in the shortcut mode.

In addition, the main control portion 1 performs the processes of steps S302 and S303 of FIG. 5 and the process of step S107 of FIG. 3, for each piece of successful authentication information.

That is, in step S303 of FIG. 5, the main control portion 1 stores the shortcut information D2 into the storage portion 12, for each piece of user identification information D01 associated with each piece of successful authentication information. As a result, the addition process of adding shortcut icons g20 is performed for each piece of user identification information D01.

Furthermore, in step S107 of FIG. 3, the main control portion 1 organizes the shortcut menu screen g2 based on the shortcut information D2 that is associated with the successful authentication information, and outputs the shortcut menu screen g2.

It is noted that the main control portion 1 that executes the processes of steps S302 and S303 of FIG. 5 is an example of the shortcut icon addition processing portion. Here, operating the Add icon g21 when the processing mode is the shortcut mode is an example of a predetermined icon addition operation performed on the shortcut menu screen g2.

In addition, the main control portion 1 that executes the process of step S107 of FIG. 3 is an example of the first shortcut output portion. When the icon addition operation is performed, the main control portion 1, in step S107, causes the touch panel unit 20 to display a standard menu screen g1 that is associated with the operated shortcut icon g20, based on the first shortcut information.

<Step S304>

On the other hand, when the Add icon g21 is operated when the processing mode is the group mode, the main control portion 1 executes a grouping process (S304-S307).

In the grouping process, the main control portion 1 executes a group name input process (S304). In the group name input process, a group name D26 of the shortcut icon g20 is obtained based on a character input operation performed on the operation portion 21.

As one example, the main control portion 1 causes the touch panel unit 20 to display a group name input screen (not shown). Furthermore, the main control portion 1 obtains a group name D26 through a character input operation performed on the group name input screen.

<Step S305>

Furthermore, in the grouping process, the main control portion 1 executes a shortcut selection process. In the shortcut selection process, one or more shortcut icons g20 are selected as targets of the grouping, from among the shortcut icons g20 included in the shortcut menu screen g2. The main control portion 1 selects shortcut icons g20 in accordance with operations performed on the operation portion 21.

<Step S306>

Furthermore, in the grouping process, the main control portion 1 executes an icon collection process. In the icon collection process, a group icon gr20 is added, and the shortcut icons g20 selected in step S305 are collected in the added group icon gr20.

Figure 17:
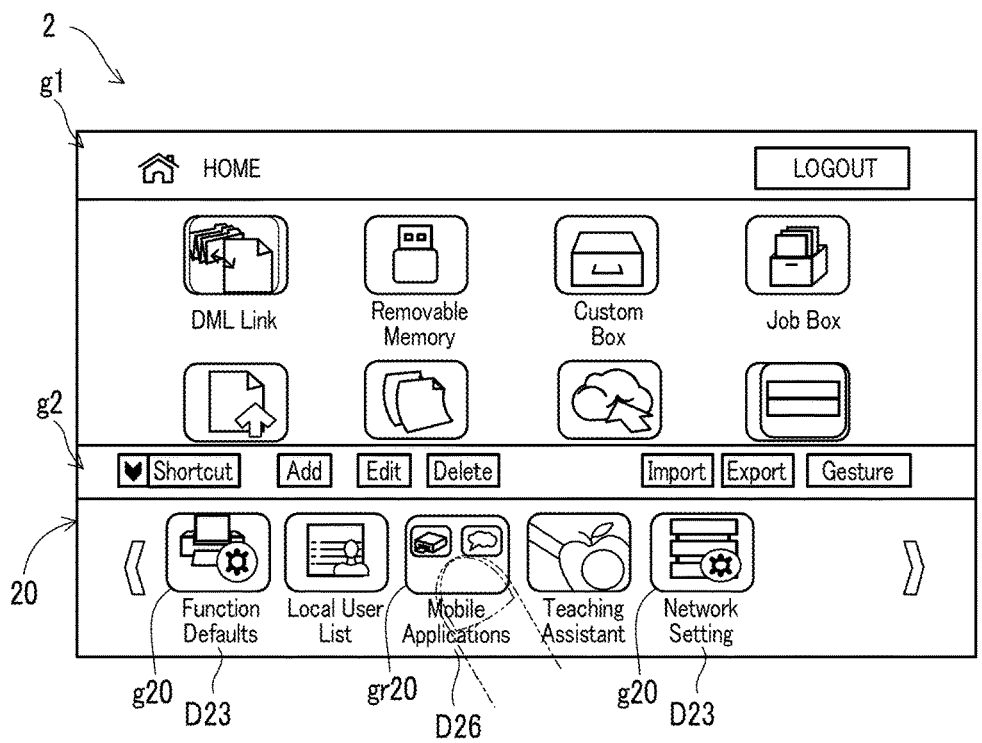
FIG. 17 is a diagram showing a shortcut menu screen in which a shortcut group icon has been set in the image forming apparatus.

FIG. 17 shows an example in which two shortcut icons g20 among shortcut icons g20 shown in FIG. 16 are collected in one group icon gr20. The main control portion 1 causes the shortcut menu screen g2 to display a group name D26 as well as the group icon gr20.

<Step S307>

Furthermore, the main control portion 1 stores shortcut information D2 of the added group icon gr20, into the storage portion 12. More specifically, the main control portion 1 stores, as the shortcut information D2, a group number D25 and a group name D26 into the storage portion 12, wherein the group number D25 and the group name D26 are associated with a shortcut number D21 of the shortcut icon g20 in which the icons were collected.

When the processes of steps S304-S307 end, the addition process ends. After the group number D25 and the group name D26 of the shortcut information D2 are registered in the storage portion 12, the main control portion 1, in step S107 of FIG. 3, can cause the touch panel unit 20 to display a shortcut menu screen g2 including the group icon gr20 (see FIG. 17).

When the group icon gr20 is operated, the main control portion 1 causes the touch panel unit 20 to display a shortcut menu screen g2 that includes only the shortcut icons g20 that were collected in the operated group icon gr20 (see FIG. 18).

In addition, the main control portion 1 executes processes of steps S304-S307 of FIG. 5 for each piece of successful authentication information.

[Gesture Registration Process]

Figure 6:
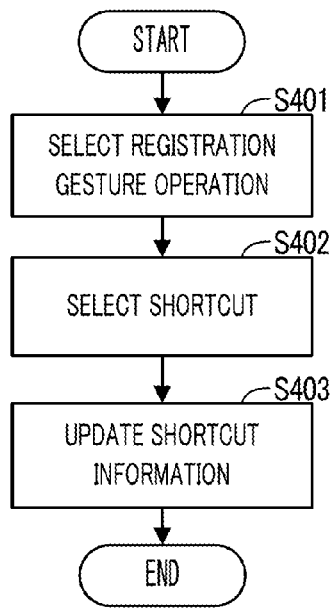
FIG. 6 is a flowchart showing an example of a gesture registration process performed in the shortcut process of the image forming apparatus.

Next, a description is given of an example of a procedure of the gesture registration process (step S205 of FIG. 4) executed by the main control portion 1 of the image forming apparatus 10, with reference to the flowchart shown in FIG. 6. In the following description, S401, S402, . . . are identification signs representing the steps executed by the main control portion 1.

The following process of the main control portion 1 is realized as the MPU 11 executes a gesture registration program Pr6.

<Step S401>

In the gesture registration process, the main control portion 1 selects a registration gesture operation in accordance with an operation performed on the touch panel unit 20.

The registration gesture operation is a gesture operation that is performed on the touch panel unit 20 and is different from the shortcut call operation. In the present embodiment, the registration gesture operation includes a plurality of swipe operations of moving the touch position toward the inside of the panel, the origin of the movement being any of a plurality of sides 202 and a plurality of corners 203 of the panel 20p of the touch panel unit 20.

Figure 14:
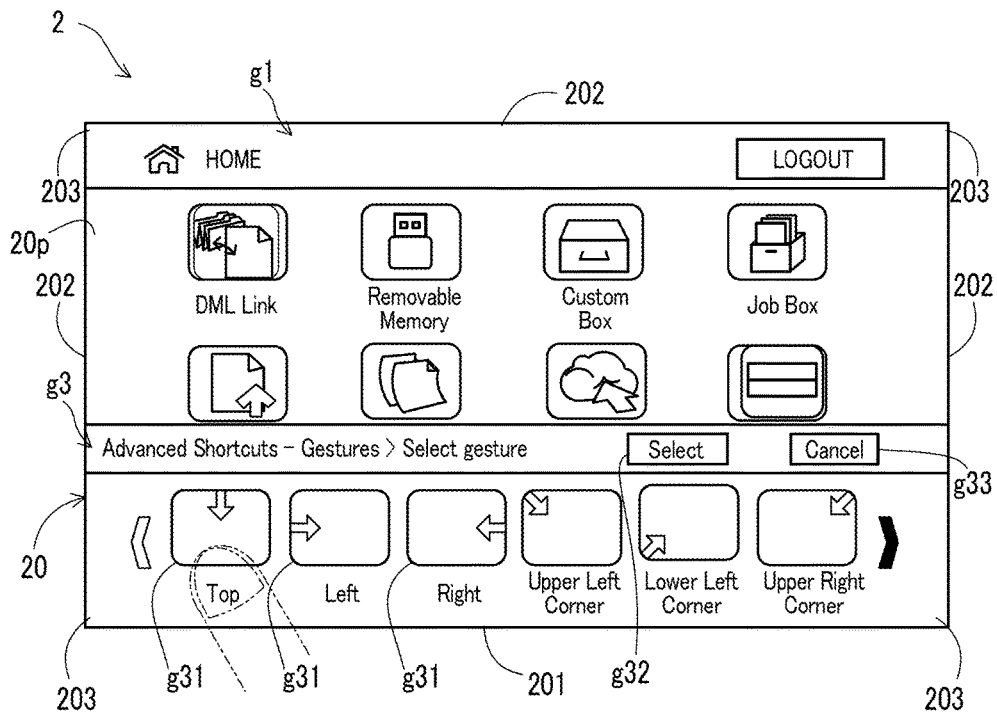
FIG. 14 is a diagram showing a registration gesture selection screen in the image forming apparatus.

For example, the main control portion 1 causes the touch panel unit 20 to display a registration gesture selection screen g3 shown in FIG. 14 such that a registration gesture operation is selected on the registration gesture selection screen g3. The registration gesture selection screen g3 includes a plurality of registration gesture selection icons g31 that are respectively associated with different registration gesture operations. Furthermore, the registration gesture selection screen g3 includes a selection confirmation icon g32 and a cancellation icon g33.

In the example shown in FIG. 14, six registration gesture selection icons g31 respectively represent the following registration gesture operations. The first registration gesture operation is a swipe operation of moving the touch position toward the inside of the panel 20p, the origin of the movement being an upper side 202 of the panel 20p of the touch panel unit 20.

The second registration gesture operation is a swipe operation of moving the touch position toward the inside, the origin of the movement being a left side 202 of the panel 20p of the touch panel unit 20. The third registration gesture operation is a swipe operation of moving the touch position toward the inside, the origin of the movement being a right side 202 of the panel 20p of the touch panel unit 20.

The fourth registration gesture operation is a swipe operation of moving the touch position toward the inside, the origin of the movement being an upper left corner 203 of the panel 20p of the touch panel unit 20. The fifth registration gesture operation is a swipe operation of moving the touch position toward the inside, the origin of the movement being a lower left corner 203 of the panel 20p of the touch panel unit 20. The sixth registration gesture operation is a swipe operation of moving the touch position toward the inside, the origin of the movement being an upper right corner 203 of the panel 20p of the touch panel unit 20.

The main control portion 1 selects a registration gesture operation in accordance with operation of a registration gesture selection icon g31 and the selection confirmation icon g32. In addition, when the cancellation icon g33 is operated, the main control portion 1 cancels the gesture registration process.

<Step S402>

Furthermore, in the gesture registration process, the main control portion 1 executes a shortcut selection process. In the shortcut selection process, a shortcut icon g20 to be associated with the registration gesture operation is selected from among shortcut icons g20 included in the shortcut menu screen g2. The main control portion 1 selects a shortcut icon g20 in accordance with an operation performed on the operation portion 21.

<Step S403>

Furthermore, the main control portion 1 stores information that associates the selected registration gesture operation with a shortcut icon g20, into the storage portion 12 as a part of the shortcut information D2. This completes the gesture registration process.

More specifically, the main control portion 1 stores, into the storage portion 12, a gesture identifier D24 that identifies the registration gesture operation selected in step S401, as a part of the shortcut information D2 that is associated with the shortcut number D21 of the shortcut icon g20 selected in step S402.

It is noted that the main control portion 1 executes the process of step S403 for each piece of successful authentication information. That is, in step S403, the main control portion 1 updates the shortcut information D2 associated with a piece of successful authentication information. As a result, the main control portion 1 executes the process of step S109 of FIG. 3 for each piece of successful authentication information.

The gesture identifier D24 of the shortcut information D2 is an example of the second shortcut information that represents the correspondence between the shortcut icon g20 and the registration gesture operation.

In addition, when the Gesture registration icon g24 is operated on the shortcut menu screen g2, the main control portion 1 executes the processes of steps S401-S403. In the processes of steps S401-S403, the gesture identifier D24 of the shortcut information D2 is stored in the storage portion 12 in accordance with an operation performed on the touch panel unit 20. Operating the Gesture registration icon g24 is an example of the predetermined gesture registration operation. In addition, the main control portion 1 that executes the processes of steps S401-S403 is an example of the gesture registration portion.

After the gesture identifier D24 of the shortcut information D2 is registered by executing the processes of steps S401-S403, the main control portion 1, in step S109 of FIG. 3, can cause the touch panel unit 20 to display the objective standard menu screen g1 in response to the registration gesture operation.

The process of step S109 of FIG. 3 is executed when the registration gesture operation is performed on the touch panel unit 20 that is displaying the standard menu screen g1. The process of step S109 allows the standard menu screen g1 that is associated with the shortcut icon g20 that is associated with the registration gesture operation, to be displayed on the touch panel unit 20. The main control portion 1 that executes the process of step S109 is an example of the second shortcut output portion.

Figure 15:
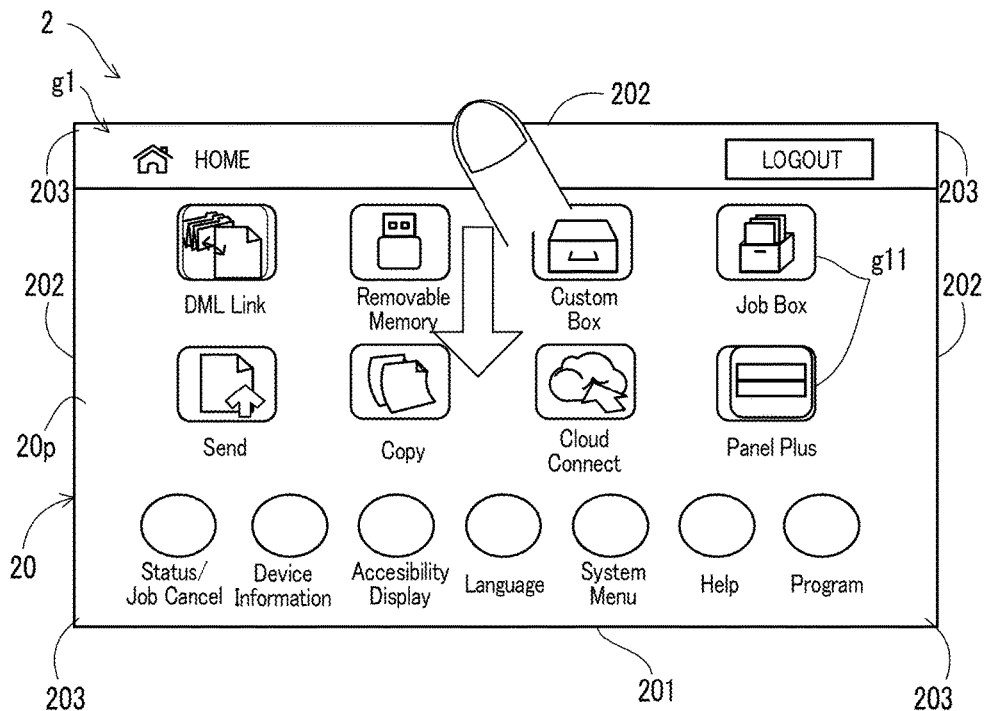
FIG. 15 is a diagram showing the touch panel unit when a registration gesture selection operation is performed on an arbitrary menu screen in the image forming apparatus.

FIG. 15 shows an example of the touch panel unit 20 when the registration gesture operation is performed. The registration gesture operation shown in FIG. 15 is a swipe operation of moving the touch position toward the inside of the panel 20*p*, the origin of the movement being the upper side 202 of the panel 20*p* of the touch panel unit 20.

In steps S401-S403 of FIG. 6 and step S109 of FIG. 3, the main control portion 1 executes the processes by distinguishing among the swipe operations that have different origins such as the sides 202 and the corners 203.

In addition, when the Edit icon g22 of the shortcut menu screen g2 is operated, the main control portion 1 executes an editing process. In the editing process, the type of the shortcut icon g20, the icon name D23, the group name D26 and the like are changed in accordance with operations performed on the touch panel unit 20. In this case, the main control portion 1 updates editing-target information in the shortcut information D2.

In addition, when the Delete icon g23 of the shortcut menu screen g2 is operated, the main control portion 1 executes a deletion process. In the deletion process, the shortcut icon g20, the icon name D23, the group name D26 and the like are deleted in accordance with operations performed on the touch panel unit 20. In this case, the main control portion 1 deletes deletion-target information from the shortcut information D2.

In addition, when the Import icon g26 of the shortcut menu screen g2 is operated, the main control portion 1 executes an import process. In the import process, the shortcut information D2 is obtained from an external apparatus or an attachable/detachable external memory. In this case, the main control portion 1 identifies a destination from which to obtain the shortcut information D2, in accordance with operations performed on the touch panel unit 20.

In addition, when the Export icon g27 of the shortcut menu screen g2 is operated, the main control portion 1 executes an export process. In the export process, the shortcut information D2 is copied from the own apparatus to an external apparatus or an attachable/detachable external memory. In this case, the main control portion 1 identifies a destination to which the shortcut information D2 is to be copied, in accordance with operations performed on the touch panel unit 20.

In the present embodiment, the shortcut menu screen g2 is not always displayed like function keys, but is displayed only when the shortcut call operation is performed. As a result, it is possible to register and use a shortcut while securing an area of the standard menu screen g1 for the image processing as much as possible in the display area of the touch panel unit 20.

Furthermore, the operation performed to add the shortcut icon g20 is a very simple operation which is performed in the state where the objective standard menu screen g1 is displayed on the touch panel unit 20. As a result, the user can register a shortcut intuitively and easily for the movement to the objective standard menu screen g1.

In addition, with the execution of the gesture registration process, it becomes possible to cause the objective standard menu screen g1 to be displayed by performing the registration gesture operation once, without via the shortcut menu screen g2.

In the present embodiment, the registration gesture operation includes a plurality of swipe operations of moving the touch position toward the inside of the panel, the origin of the movement being any of a plurality of sides 202 and a plurality of corners 203 of the panel 20*p* of the touch panel unit 20. Such swipe operations can easily be distinguished from the operation icons g11 of the standard menu screen g1. As a result, it becomes possible to avoid an erroneous performance of the registration gesture operation. This also applies to the shortcut call operation.

In addition, the processes of steps S302 and S303 of FIG. 5 and the process of step S107 of FIG. 3 are executed for each piece of successful authentication information with distinction. This also applies to the processes of steps S401-S403 of FIG. 6 and the process of step S109 of FIG. 3. This allows the shortcut function to be customized for each user and improves the convenience thereof.

Application Examples

FIG. 21 shows how the registration gesture operation is performed on an arbitrary standard menu screen g1 displayed on the touch panel unit 20 of the image forming apparatus 10 according to an application example of the present disclosure.

FIG. 21 shows that the registration gesture operation whose origin is a side of the panel 20*p* of the touch panel unit 20 can be classified into a plurality of swipe operations that have different movement directions of the touch position toward the inside of the panel 20*p*.

FIG. 21 shows that the registration gesture operation whose origin is a side of the panel 20*p* of the touch panel unit 20 can be classified into three types of swipe operations that have different movement directions of the touch position toward the inside of the panel. The first swipe operation is a swipe operation of moving the touch position from a side of the panel 20*p* in a direction R0 that is perpendicular to the side of the panel 20*p*. The second swipe operation is a swipe operation of moving the touch position from a side of the panel 20*p* in a first diagonal direction R1 with respect to the side of the panel 20*p*. The third swipe operation is a swipe operation of moving the touch position from a side of the panel 20*p* in a second diagonal direction R2 with respect to the side of the panel 20*p*.

The main control portion 1 may execute the processes of steps S302 and S303 of FIG. 5 and the process of step S107 of FIG. 3, by distinguishing among the swipe operations that have different directions in which the touch position moves from a side 202. This makes it possible to adopt an increased number of types of registration gesture operations.

In the processes of steps S401-S403 of FIG. 6, the main control portion 1 may execute a display format registration process. In the display format registration process, information of the display format of the standard menu screen g1 may be set into the shortcut information D2 for each of the swipe operations that have different origins.

As described above, the origins may be any of the sides 202 and the corners 203 of the panel 20*p* of the touch panel unit 20. For example, one or more display formats among the display size, display color, brightness, and display angle of the standard menu screen g1, may be set.

In the case where information of a display format has been set, the main control portion 1 may, in step S103 of FIG. 3, cause the touch panel unit 20 to display the standard menu screen g1 in the display format associated with the registration gesture operation.

It is noted that the image forming apparatus and the method for controlling an operation screen of an image forming apparatus of the present disclosure may be configured by, within the scope of claims, freely combining the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a touch panel unit including a panel which serves as both an operation portion and a screen display portion; and
a processor configured to execute:
a standard menu screen control portion configured to, in response to a selection operation performed on the panel, cause the panel to display a standard menu screen among a plurality of standard menu screens for image processing;
a shortcut menu screen output portion configured to, when a shortcut call operation is performed on the panel that is displaying the standard menu screen, display a shortcut menu screen over the standard menu screen;
a shortcut processing portion configured to execute a process in response to an operation performed on the shortcut menu screen, the shortcut processing portion including:
a shortcut icon addition processing portion configured to, when a predetermined icon addition operation is performed on the shortcut menu screen, add a shortcut icon to the shortcut menu screen and store first shortcut information into a first storage portion, the first shortcut information indicating correspondence between the added shortcut icon and the standard menu screen being displayed on the panel; and
a first shortcut output portion configured to, when the shortcut icon is operated, cause the panel to display the standard menu screen that is associated with the operated shortcut icon, based on the first shortcut information;
a gesture registration portion configured to, when a predetermined gesture registration operation is performed on the shortcut menu screen, store second shortcut information into a second storage portion in accordance with an operation performed on the panel, the second shortcut information indicating correspondence between the shortcut icon and a registration gesture operation that is a gesture operation registered by the predetermined gesture registration operation; and
a second shortcut output portion configured to, when the registration gesture operation is performed on the panel that is displaying any of the plurality of standard menu screens, cause the panel to display the standard menu screen associated with the shortcut icon that is associated with the registration gesture operation, wherein
the shortcut call operation is a predetermined gesture operation performed on the panel that is displaying the standard menu screen,
the registration gesture operation is a gesture operation that is performed on the panel and is different from the shortcut call operation,
the registration gesture operation includes at least six types of swipe operations of moving a touch position toward an inside of the panel, an origin of movement of the touch position being any of a plurality of sides and a plurality of corners of the panel, and the gesture registration portion and the second shortcut output portion execute processes by distinguishing among a plurality of swipe operations that have different origins.

2. The image forming apparatus according to claim 1, wherein
the gesture registration portion and the second shortcut output portion execute processes by distinguishing among the following three types of swipe operations that have different movement directions of the touch position moved from a side of the panel toward the inside of the panel: a swipe operation of moving the touch position from the side of the panel in a direction perpendicular to the side of the panel; a swipe operation of moving the touch position from the side of the panel in a first diagonal direction with respect to the side of the panel; and a swipe operation of moving the touch position from the side of the panel in a second diagonal direction with respect to the side of the panel.

3. The image forming apparatus according to claim 1, wherein
the gesture registration portion sets information of display format of the standard menu screen into the second shortcut information for each of the plurality of swipe operations that have different origins,
the second shortcut output portion causes the panel to display the standard menu screen in a display format that is associated with the registration gesture operation, and
display formats that can be set by the gesture registration portion include one or more among a display size, a display color, brightness, and a display angle.

4. The image forming apparatus according to claim 1, wherein:
the processor is further configured to execute an authentication control portion configured to execute an authentication process of determining whether or not an authentication is successful or not by comparing authentication input information that is input via the panel or another information input portion, with authentication information that is stored in a third storage portion in advance, and when the authentication process is successful, permit the standard menu screen to be operated, and
the shortcut icon addition processing portion and the first shortcut output portion respectively execute processes for each piece of authentication information that was used in the authentication process when the authentication was determined successful.

5. The image forming apparatus according to claim 1, wherein:
the processor is further configured to execute an authentication control portion configured to execute an authentication process of determining whether or not an authentication is successful or not by comparing authentication input information that is input via the panel or another information input portion, with authentication information that is stored in a third storage portion in advance, and when the authentication process is successful, permit the standard menu screen to be operated, and
the shortcut icon addition processing portion, the first shortcut output portion, and the second shortcut output portion respectively execute processes for each piece of authentication information that was used in the authentication process when the authentication was determined successful.

6. A method for controlling an operation screen of an image forming apparatus that includes a touch panel unit having a panel which serves as both an operation portion and a screen display portion, the method comprising the following that are executed by a processor that controls the touch panel unit:

causing, in response to a selection operation performed on the panel, the panel to selectively display a standard menu screen among a plurality of standard menu screens for image processing;

displaying a shortcut menu screen over the standard menu screen when a shortcut call operation is performed on the panel that is displaying the standard menu screen;

executing a process in response to an operation performed on the shortcut menu screen, the process including:

when a predetermined icon addition operation is performed on the shortcut menu screen, adding a shortcut icon to the shortcut menu screen and storing first shortcut information into a first storage portion, the first shortcut information indicating correspondence between the added shortcut icon and the standard menu screen being displayed on the panel; and when the shortcut icon is operated, causing the panel to display the standard menu screen that is associated with the operated shortcut icon, based on the first shortcut information;

storing second shortcut information into a second storage portion in accordance with an operation performed on the panel when a predetermined gesture registration operation is performed on the shortcut menu screen, the second shortcut information indicating correspondence between the shortcut icon and a registration gesture operation that is a gesture operation registered by the predetermined gesture registration operation; and causing the panel to display the standard menu screen associated with the shortcut icon that is associated with the registration gesture operation when the registration gesture operation is performed on the panel that is displaying any of the plurality of standard menu screens, wherein the shortcut call operation is a predetermined gesture operation performed on the panel that is displaying the standard menu screen, the registration gesture operation is a gesture operation that is performed on the panel and is different from the shortcut call operation, the registration gesture operation includes at least six types of swipe operations of moving a touch position toward an inside of the panel, an origin of movement of the touch position being any of a plurality of sides and a plurality of corners of the panel, and the registration gesture operation is distinguished from among a plurality of swipe operations that have different origins.

7. The method according to claim 6, further comprising, for the registration gesture operation, distinguishing among the following three types of swipe operations that have different movement directions of the touch position moved from a side of the panel toward the inside of the panel: a swipe operation of moving the touch position from the side of the panel in a direction perpendicular to the side of the panel; a swipe operation of moving the touch position from the side of the panel in a first diagonal direction with respect to the side of the panel; and a swipe operation of moving the touch position from the side of the panel in a second diagonal direction with respect to the side of the panel.

* * * * *